(12) United States Patent
Desai et al.

(10) Patent No.: US 11,057,773 B2
(45) Date of Patent: Jul. 6, 2021

(54) SYSTEMS AND METHODS FOR DETECTING ACCESS POINT IMPERSONATORS

(71) Applicant: Cisco Technology, Inc., San Jose, CA (US)

(72) Inventors: Vishal Satyendra Desai, San Jose, CA (US); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/544,651

(22) Filed: Aug. 19, 2019

(65) Prior Publication Data

US 2020/0162924 A1    May 21, 2020

Related U.S. Application Data

(60) Provisional application No. 62/770,153, filed on Nov. 20, 2018.

(51) Int. Cl.
*H04W 12/121* (2021.01)
*H04W 12/108* (2021.01)

(52) U.S. Cl.
CPC ....... *H04W 12/121* (2021.01); *H04W 12/108* (2021.01)

(58) Field of Classification Search
CPC ... H04W 12/12; H04W 12/10; H04W 12/003; H04W 12/004; H04W 12/005; H04W 12/00516; H04W 12/007; H04W 12/08; H04W 12/1008; H04W 12/1201; H04W 12/1202; H04W 12/1204; H04W 48/02; H04W 48/00; H04W 88/08; H04W 88/10; H04W 88/12; H04W 92/12; H04W 40/24; H04W 40/244; H04W 76/11; H04W 8/18;
(Continued)

(56) References Cited

U.S. PATENT DOCUMENTS 6,754,488 B1 * 6/2004 Won et al. .................... 455/424
7,181,530 B1   2/2007 Halasz et al.
(Continued)

OTHER PUBLICATIONS

Saruhan, Ibrahim Halil, et al. "Detecting and Preventing Rogue Devices on the Network," Aug. 8, 2007, 63 pages.
(Continued)

*Primary Examiner* — Meless N Zewdu
(74) *Attorney, Agent, or Firm* — Polsinelli PC (57) ABSTRACT

The present disclosure is related to systems and methods for detecting and disabling operations of access point impersonators in a network. In one aspect, a method includes receiving, at a network controller of a network, beacon reports from a plurality of access points; determining, by the network controller, one or more target areas with at least one potential access point impersonator operating therein; sending, by the network controller, on-demand beacon requests to one or more of the plurality of access points with corresponding coverage areas overlapping with the one or more target areas; receiving, at the network controller, responses to the on-demand beacon requests from the one or more of the plurality of access points; and determining, by the network controller, at least one access point impersonator based on the responses.

17 Claims, 4 Drawing Sheets

(58) Field of Classification Search
CPC ..... H04W 24/02; H04W 72/04; H04W 24/10; H04W 12/121; H04W 12/108; H04W 12/122; H04W 40/26; H04W 40/28; H04W 76/15; H04W 76/38; H04W 92/04; H04W 92/00; H04W 88/00; H04W 88/02; H04W 88/188; H04W 88/18; H04W 72/1278; H04W 72/1205; H04W 72/121; H04W 48/20; H04W 24/00; H04W 12/00; H04W 12/082; H04W 2/108; H04W 12/60; H04W 12/63; H04W 12/80; H04W 12/73; H04M 3/20; H04M 3/205; H04M 7/0075; H04M 7/0078; H04M 7/0081; H04M 7/0084; H04M 7/0093; H04M 7/06; G01S 1/00; G01S 5/00; G01S 1/02; G01S 1/024; G01S 1/026; G01S 1/028; G01S 1/042; G01S 1/0426; G01S 1/70; G01S 5/02; G01S 5/0231; G01S 5/0244; G01S 1/306; G01S 2201/00; G01S 2201/01; G01S 2205/05

See application file for complete search history.

(56) References Cited

U.S. PATENT DOCUMENTS

| | | | |
|---|---|---|---|
| 7,346,338 B1 | 3/2008 | Calhoun et al. | |
| 7,447,184 B1 * | 11/2008 | Kharvandikar et al. | 370/338 |
| 9,369,831 B2 * | 6/2016 | Nitta et al. | H04W 4/02 |
| 9,706,551 B2 | 7/2017 | Jeong et al. | |
| 2005/0197136 A1 * | 9/2005 | Friday et al. | 455/456.1 |
| 2006/0193284 A1 * | 8/2006 | Stieglitz et al. | 370/328 |
| 2006/0209700 A1 * | 9/2006 | Sunder et al. | 370/248 |
| 2007/0286143 A1 * | 12/2007 | Olson et al. | 370/338 |
| 2008/0101283 A1 * | 5/2008 | Calhoun et al. | 370/328 |
| 2009/0271864 A1 * | 10/2009 | Dietrich et al. | 726/23 |
| 2011/0193677 A1 * | 8/2011 | Ho et al. | 340/3.1 |
| 2011/0314147 A1 * | 12/2011 | Whelan et al. | 709/224 |
| 2012/0081249 A1 * | 4/2012 | Kaiser et al. | 342/174 |
| 2012/0088505 A1 * | 4/2012 | Toh et al. | 455/434 |
| 2013/0155959 A1 * | 6/2013 | Ikeda et al. | H04W 88/08 |
| 2014/0179352 A1 * | 6/2014 | V.M. et al. | H04W 4/02 |
| 2015/0334632 A1 * | 11/2015 | Rudolph et al. | H04W 48/02 |
| 2016/0100315 A1 * | 4/2016 | Schenkel et al. | H04W 12/08 |
| 2016/0309332 A1 * | 10/2016 | Norrman et al. | H04W 12/12 |
| 2016/0330229 A1 * | 11/2016 | Watson et al. | H04L 63/1433 |
| 2017/0111360 A1 * | 4/2017 | Hooda et al. | H04L 63/10 |
| 2019/0380043 A1 * | 12/2019 | Hassan et al. | H04W 16/18 |
| 2020/0107197 A1 * | 4/2020 | Kaushik et al. | H04W 12/1202 |

OTHER PUBLICATIONS

Aminanto, Muhamad Erza, et al. , "Detecting Impersonation Attack in WiFi Networks Using Deep Learning Approach," 2016, 12 pages.

* cited by examiner

SYSTEMS AND METHODS FOR DETECTING ACCESS POINT IMPERSONATORS

RELATED APPLICATIONS DATA

This application claims priority to U.S. Provisional Application No. 62/770,153 filed on Nov. 20, 2018, the entire content of which is incorporated herein by reference.

TECHNICAL FIELD

The subject matter of this disclosure relates in general to the field of computer networking, and more particularly, to systems and methods for improving the operation of an enterprise network by detecting access point impersonators.

BACKGROUND

A campus network can provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, colleges and universities, oil and gas facilities, factories, and similar locations.

Presence of access point impersonators/rogue access points (e.g., Wi-Fi impersonators) within coverage area of access points of an enterprise network, present security issues where such impersonators can steal personal and confidential data (e.g., usernames, passwords, MAC addresses, etc.) of client devices connected to access points, in coverage area of which the impersonators operate.

This problem is particularly relevant to access points with directional antennas deployed in settings such as stadiums, large auditoriums, concert/event halls etc. In such deployments, APs with direction antennas typically have a very narrow view of the radio frequency (RF) conditions of the environment in which they are deployed. Due to their narrow Wi-Fi beam pattern, these APs are significantly more prone to security vulnerabilities brought by nearby rogue Access Points and impersonators. Impersonators can go unnoticed and steal vital information from devices associated to these APs by impersonating Basic Service Set ID (BSSIDs) of access points.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The detailed description set forth below is intended as a description of various configurations of example embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Various example embodiments of the present disclosure are directed to systems and methods for detecting and disabling operations of access point impersonators in a network.

As noted above, presence of access point impersonators/rogue access points (e.g., Wi-Fi impersonators) within coverage areas of actual (valid, registered, etc.) access points of a network, presents security issues to networks and devices operating therein. Each access point (e.g., a first access point) of a network can have a unique BSSID that is advertised to devices in its vicinity and is used to establish an active session/connection with one or more such devices. Such access point may be unaware of existence of other access points (e.g., a second access point) within the network because the coverage areas of these access points may not overlap. An access point impersonator can sometime operate within coverage area of the first access point and advertise BSSID of the second access point to devices connected to the first access point. Because the first access point is unaware of existence of the second access point, the access point impersonator can operate to scoop/steal identification information (e.g., usernames, passwords, MAC addresses) of devices connected to the first access point.

Detection of such access point impersonators and disabling operations thereof can be achieved by providing a network controller (e.g., a controller of Dynamic Network Access Center (DNAC) developed by Cisco Technology, Inc. of San Jose, Calif.) with a holistic view of the network's access points and their locations and using beacon reports to detect operation of access point impersonators in areas in which access points other than registered access points with DNAC in that area should not be heard, flag such detections as possible access point impersonators, request further "specialized" beacon reports to validate those possible access point impersonators as actual impersonators and implement functions to disable operations of detected actual access point impersonators.

In one aspect, a method includes receiving, at a network controller of a network, beacon reports from a plurality of access points; determining, by the network controller, one or more target areas with at least one potential access point impersonator operating therein; sending, by the network controller, on-demand beacon requests to one or more of the plurality of access points with corresponding coverage areas overlapping with the one or more target areas; receiving, at the network controller, responses to the on-demand beacon requests from the one or more of the plurality of access points; and determining, by the network controller, at least one access point impersonator based on the responses.

In one aspect, a controller includes memory having computer readable instructions and one or more processors. The one or more processors are configured to execute the computer readable instructions to receive beacon reports from a plurality of access points; determine one or more target areas with at least one potential access point impersonator operating therein; send on-demand beacon requests to one or more of the plurality of access points with corresponding coverage areas overlapping with the one or more target areas; receive responses to the on-demand beacon requests from the one or more of the plurality of access points; and determine at least one access point impersonator based on the responses.

In one aspect, one or more computer-readable media include computer-readable instructions, which when executed by one or more processors of a network controller of a network, cause the one or more processors to receive beacon reports from a plurality of access points; determine one or more target areas with at least one potential access point impersonator operating therein; send on-demand beacon requests to one or more of the plurality of access points with corresponding coverage areas overlapping with the one or more target areas; receive responses to the on-demand beacon requests from the one or more of the plurality of access points; and determine at least one access point impersonator based on the responses.

DETAILED DESCRIPTION

Throughout the present disclosure, terms client and client devices may be used interchangeably and may refer to any type of known or to be developed device capable of establishing a wireless communication with an access point, a base station, an e-nodeB, an eNB, etc., including but not limited to, mobile devices, cellular phones, tablets, laptops, IoT devices, etc.

Furthermore, throughout the present disclosure, terms edge and boundary may be used interchangeably and refer to client devices operating at a boundary of a wireless cell serviced by one access point and one or more other wireless cells serviced by other/neighboring access points, base stations, eNBs, eNodeBs, etc.

The disclosure begins with examples of physical and logical architectures of an enterprise network One example of operating a network includes intent-based networking, which is an approach for overcoming the deficiencies of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

Figure 1:
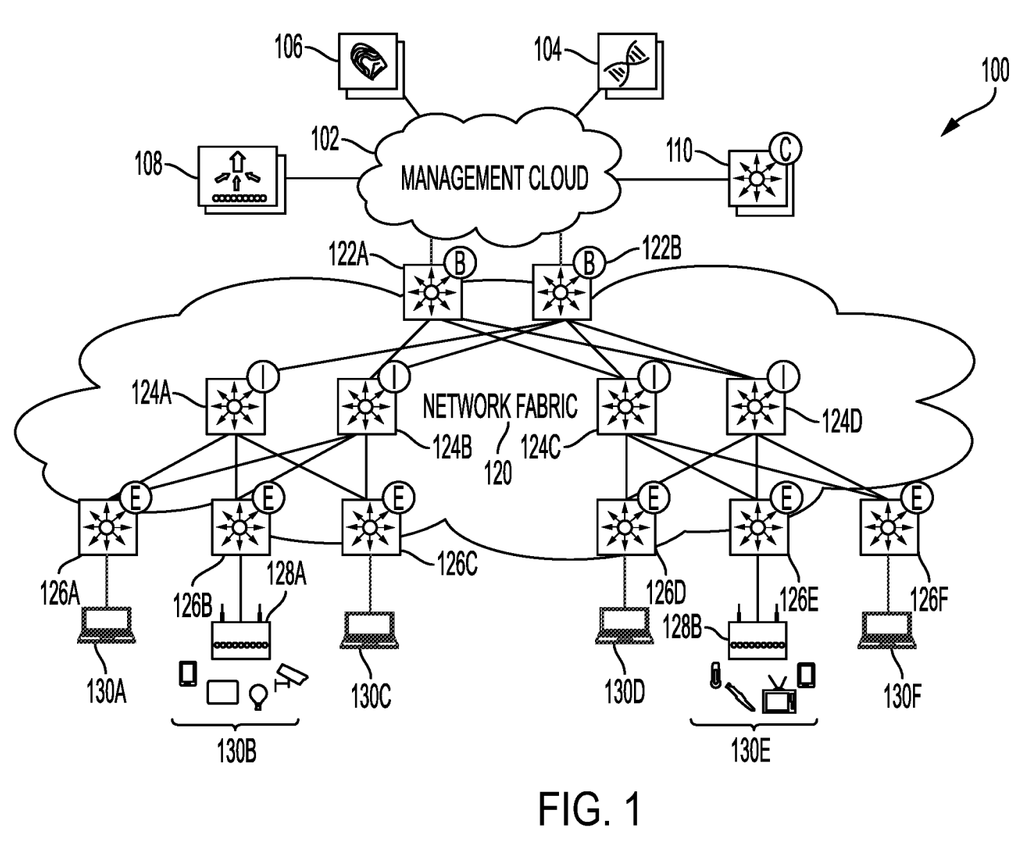
FIG. 1 illustrates an example of a physical topology of an enterprise network, according to an aspect of the present disclosure.

FIG. 1 illustrates an example of a physical topology of an enterprise network, according to one aspect of the present disclosure. In one example, network 100 provides intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 105, one or more wireless local area network controllers (WLCs) 108, and one or more fabric control plane nodes 110. In other example embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others. In some example embodiments, one or more Cisco Digital Network Architecture (Cisco DNA™) appliances can operate as the network controller appliance(s) 104.

The AAA appliance(s) 105 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some example embodiments, the AAA appliance(s) 105 can utilize Remote Authentication Dial-In User Service (RADIUS) or Diameter to communicate with devices and applications. In some example embodiments, one or more Cisco® Identity Services Engine (ISE) appliances can operate as the AAA appliance(s) 105.

The WLC(s) 108 can support fabric-enabled access points attached to the network fabric 120, handling traditional tasks associated with a WLC as well as interactions with the fabric control plane for wireless endpoint registration and roaming. In some example embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some example embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 125A-F (collectively, 125). Although the fabric control plane node(s) 110 are shown to be external to the network fabric 120 in this example, in other example embodiments, the fabric control plane node(s) 110 may be co-located with the network fabric 120. In example embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv5, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 125 and provide the Layer 3 underlay for fabric overlay traffic.

The fabric edge nodes 125 can connect endpoints to the network fabric 120 and can encapsulate/decapsulate and forward traffic from these endpoints to and from the network fabric. The fabric edge nodes 125 may operate at the perimeter of the network fabric 120 and can be the first points for attachment of users, devices, and things and the implementation of policy. In some example embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 125 for communication to outside subnets.

In this example, the network fabric can represent a single fabric site deployment which can be differentiated from a multi-site fabric deployment.

In some example embodiments, all subnets hosted in a fabric site can be provisioned across every fabric edge node 125 in that fabric site. For example, if the subnet 10.10.10.0/24 is provisioned in a given fabric site, this subnet may be defined across all of the fabric edge nodes 125 in that fabric site, and endpoints located in that subnet can be placed on any fabric edge node 125 in that fabric. This can simplify IP address management and allow deployment of fewer but larger subnets. In some example embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 125.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 125A, 125C, 125D, and 125F, respectively, and the wireless endpoints 130B and 130E can connect wirelessly to wireless access points 128B and 128E (collectively, 128), respectively, which in turn can connect by wire to fabric edge nodes 125B and 125E, respectively. In some example embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some example embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 125. The AP VXLAN tunnel can carry segmentation and policy information to and from the fabric edge nodes 125, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 125. Next, the wireless endpoints 130 can obtain IP addresses for themselves via Dynamic Host Configuration Protocol (DHCP). Once that completes, the fabric edge nodes 125 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
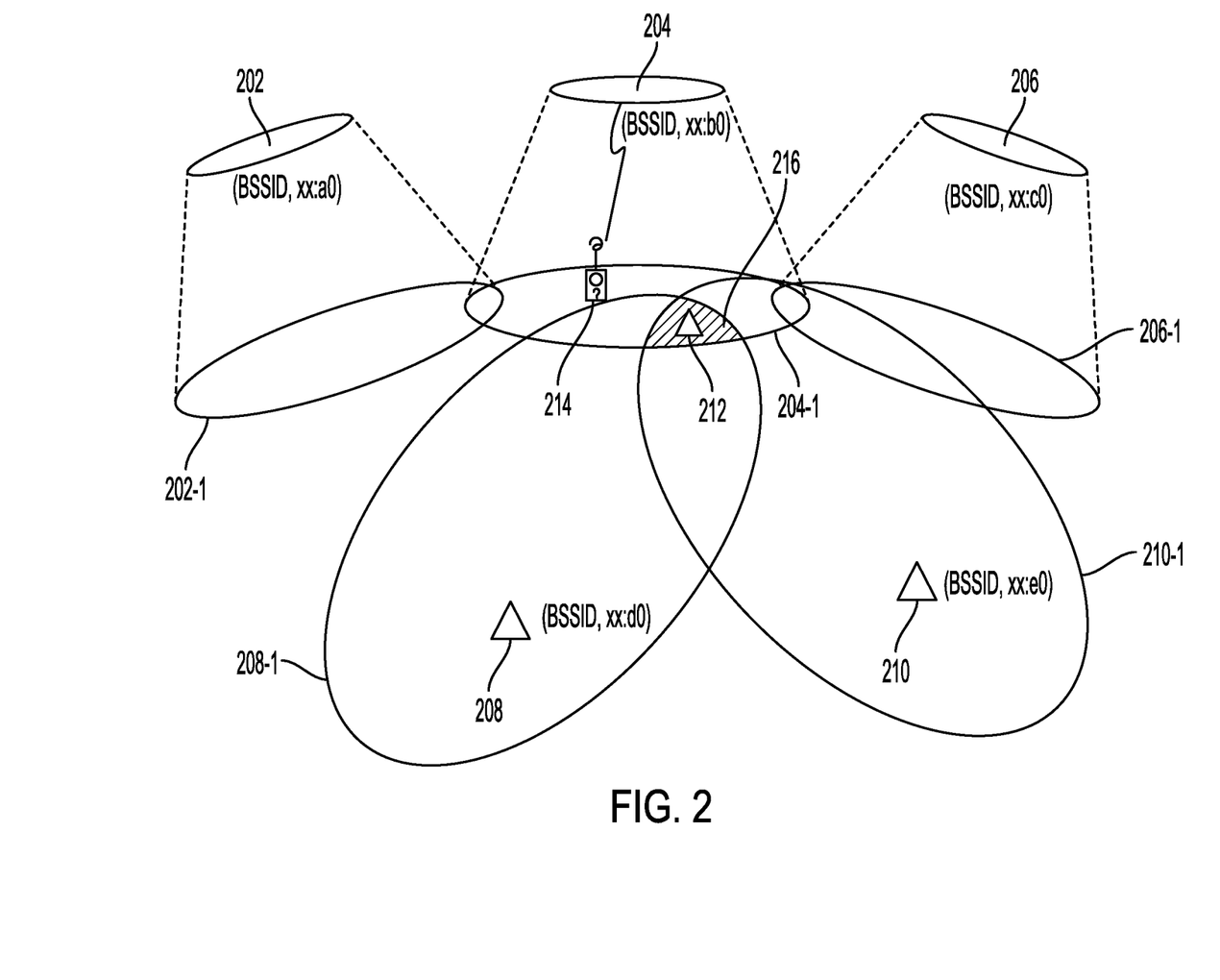
FIG. 2 illustrates an example structure of a setting in which an enterprise network of FIG. 1 are deployed and access point impersonators are present, according to an aspect of the present disclosure.

FIG. 2 illustrates an example structure of a setting in which an enterprise network of FIG. 1 are deployed and access point impersonators are present, according to an aspect of the present disclosure. As shown in example of FIG. 2, network 200 can be a simplified version of enterprise network 100*t* that includes 5 access points 202, 204, 206, 208 and 210, some of which can be directional antenna radios while other ones can be omnidirectional antenna radios. For example, access points 202, 204 and 206 can have direction antenna radios and access points 208 and 210 can have omnidirectional antenna radios. While FIG. 2 illustrates example network 200 with 5 access points, the present disclosure is not limited thereto and network 200 can have more or less access points. Any one of access points 202, 204, 206, 208 and 210 can be one of border nodes 122, fabric intermediate nodes 124, and fabric edge nodes 125, described above with reference to FIG. 1.

Each one of access points 202, 204, 206, 208 and 210 may have a unique associated BSSID, while all access points 202, 204, 206, 208 and 210 may share the same SSID (e.g., SSID of network 200). For example, BSSID of access point 202 may be xx:a0, BSSID of access point 204 may be xx:b0, BSSID of access point 206 may be xx:c0, BSSID of access point 208 may be xx:d0 and BSSID of access point 210 may be xx:e0.

As shown in FIG. 2, access point 202 has coverage area 202-1, access point 204 has coverage area 204-1, access point 206 has coverage area 206-1, access point 208 has coverage area 208-1 and access point 210 has coverage area 210-1. As shown, some of (or portions of) coverage areas may overlap.

FIG. 2 further illustrates a possible access point impersonator 212 operating within coverage area 204-1 of access point 204 but may also be heard by access points 208 and 210 as access point impersonator 212 is located at edges of coverage areas 208-1 and 210-1. For ease of discussion, only one access point impersonator 212 is illustrated and being discussed with reference to FIG. 2. However, the present disclosure is not limited thereto and there may be more or less access point impersonators operating within coverage area of any one of access points 202, 204, 206, 208 and 210.

FIG. 2 also illustrates end terminal (device) 214 that can be any one of end points 130A, 130B, 130C, 130D, 130E and/or 130F described above with reference to FIG. 1. In example of FIG. 2 device 214 is in active communication (has an established communication session) with access point 204. In one example, device 214 is an IEEE 802.11ax station capable of processing/decoding on-demand Beacon Requests from its serving access point (e.g., access point 204) and sending beacon report, which is mandated by Wi-Fi Agile Multiband Operations (MBO).

For ease of discussion, only one device 214 is illustrated and being discussed with reference to FIG. 2. However, the present disclosure is not limited thereto and there may be more or less devices present in network 200 and/or in active communication with one of access points 202, 204, 206, 208 and 210.

FIG. 2 also illustrates a shaded area 216, which can be a target area for presence of potential access point impersonators (e.g., access point impersonator 212). Target area will be further described below with reference to FIG. 3.

Figure 3:
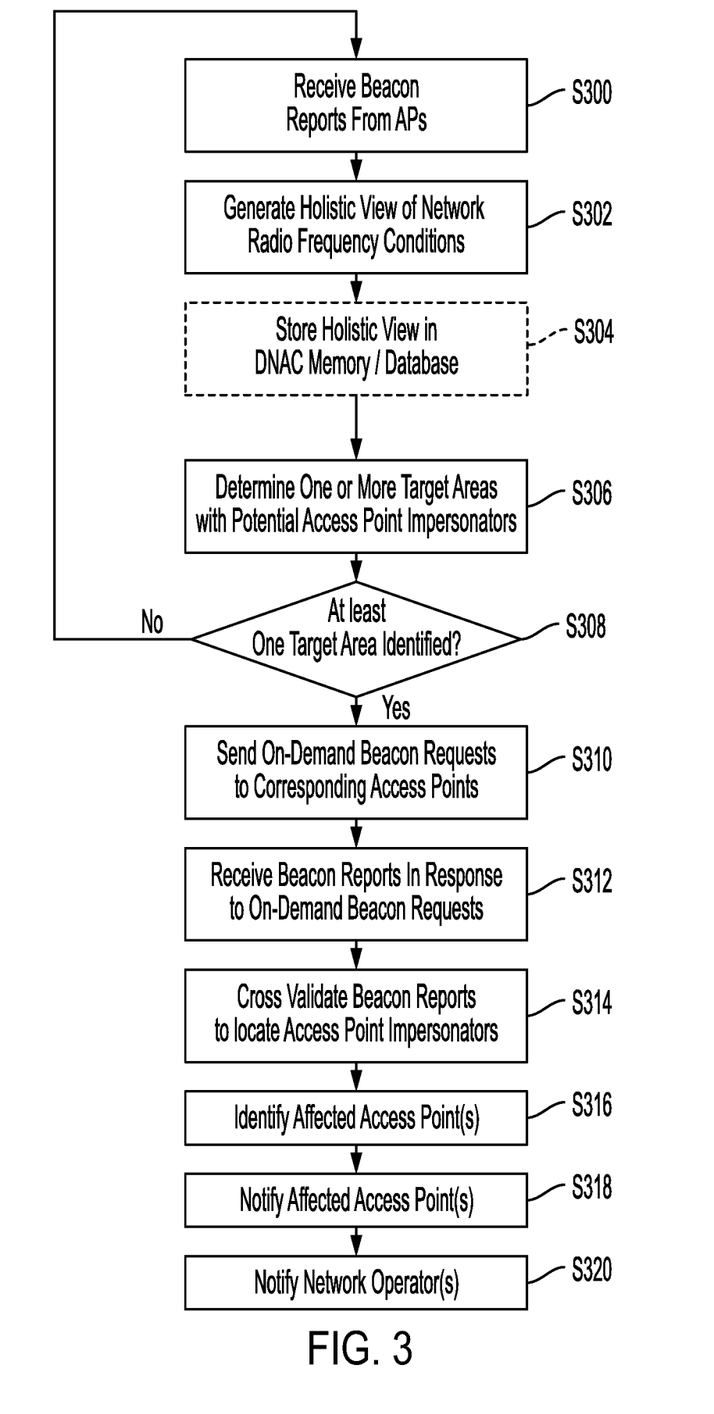
FIG. 3 illustrates an example method of detecting access point impersonators in setting of FIG. 2, according to an aspect of the present disclosure.

FIG. 3 illustrates an example method of detecting access point impersonators in setting of FIG. 2, according to an aspect of the present disclosure. FIG. 3 will be described from the perspective of will be described from perspective of a network controller of network 100/200 (e.g., a network controller appliance 104 of FIG. 1). It will be understood that such network controller may have one or more associated memories and processors (as will be described with reference to FIG. 4A and FIG. 4B) for storing and executing computer-readable instructions to implement the steps and functionalities of FIG. 3. Such network controller may be any one of network controller appliance(s) 104 and/or individual APs such as APs 202, 204, 206, 208 and 210, some external VM or even a Private or Public Cloud infrastructure managing operations of network 100/200.

FIG. 3 will be described with reference to components of FIGS. 1 and 2. Hereinafter, FIG. 3 will be described from the perspective of network appliance 104, which may also be referred to as network controller 104

At S300, network controller 104 receives beacon reports from access points (APs) 202, 204, 206, 208 and 210. Each one of APs 202, 204, 206, 208 and 210 may periodically (with such periodicity being configured based on experiments and/or empirical studies) send beacon requests (e.g., IEEE 802.11k beacon requests) to clients connected thereto. Such periodicity may not be strict and may vary based on event detection, client signal level, cell activity, etc. Within non-limiting example of FIG. 2, access point 204 may periodically send beacon requests to device 214. Responses received from device 214 by access point 204, may be forwarded to network controller 104, which as described above with reference to FIG. 1, can include assurance capabilities. In one example, responses received from device 214 can include various information about radio frequency (RF) conditions at device 214, connectivity to access points by device 214, neighboring report, data upload/download rates, etc.). For example, a beacon report received from access point 204 can indicate that device 214 connected thereto can hear/detect BSSID xx:0A (i.e., BSSID of access point 202) on channel 36.

At S302 and based on beacon reports received from access points 202, 204, 206, 208 and 210, network controller 104 generates a holistic view of RF conditions of network 200 as reported by device(s) such as device 214 connected to their respective access points such as access point 204.

At S304 (which can be optional), network controller 104 may store the generated view in an associated memory/database of network 200.

At S306, network controller 104 determines (identifies) one or more potential access point impersonators (e.g., Wi-Fi impersonators) according to any of the following example processes. In one example, at S306, network controller 104 determines possible geographical locations (target area(s) such as target area 216 in FIG. 2) in which potential access point impersonators may operate. It should be noted that while a single target area with a single access point impersonator is being described herein with reference to FIGS. 2 and 3, the present disclosure is not limited thereto and a given network such as network 100 or 200 can include any number of potential targets in each of which there may be one or more potential access point impersonators.

In one example, network controller 104 may be coupled with an analytics platform that can provide location analytics of network components such as access points and devices of network 200 using beacons such as Wi-Fi and Bluetooth beacons. Such analytics platform can be, for example, Cisco's CMX platform that can be a cloud-based analytics platform. However, other similar analytics platforms are contemplated within the scope of the present disclosure and can be used in conjunction with network controller 104 instead of or in addition to CMX platform.

When coupled to such analytics platform, network controller 104 can determine positions (geographical location information) of all access points in network 200 and all devices operating within network 200 such as device 214 using information provided by the analytics platform. Accordingly, network controller 104 can determine geographical location of device 214 relevant to access points 202, 204, 206, 208 and 210. Network controller 104 can then evaluate access points detected by each device such as device 214 (included in beacon reports received at S300). If, network controller 104 determines that device 214 can hear an access point that should not be heard by device 214 (such access point is out of a range of detection of device 214) (e.g., when the beacon report received from access point 204 at S300 indicates that device 214 connected thereto can hear/detect BSSID xx:0A (i.e., BSSID of access point 202) on channel 36), network controller 104 can flag (identify) presence of a potential access point impersonator within coverage area 204-1 of access point 204 because within coverage area 204-1, device 214 should not be able to hear/detect BSSID of access point 202.

In another example, network controller 104 may or may not be coupled to an analytics platform. However, network controller 104 can determine position of devices within network 200 such as device 214, by any other known or to be developed technique such as Angle of Arrival (AoA). Network controller 104 can then evaluate beacon reports received at S300 and determine if beacon reports for devices within a close proximity of each other include indications of same or different access points. For example, when network controller 104 determines location of device 214, network controller 104 compares beacon reports received from access point 204 and/or other access points for other devices within a close proximity (e.g., within 1 foot, 1 meter, less than 10 feet and/or any other configurable threshold distance) to device 214. If network controller 104 determines that device 214 can hear/detect access points that are not reported (not detectible) by other devices in close proximity to device 214, then network controller 104 can flag/identify presence of a potential access point impersonator within coverage area 204-1 of access point 204.

In another example, beacon reports received at S300 can include additional information other than frequency channels used and BSSID of access points to which the corresponding device(s) is/are connected. Such information can include, but is not limited to, frame types reported by connected devices, received power level at connected devices, etc.

Network controller 104 can compare the reported additional information to known signature of the access points available to network controller 104. Network controller 104 can then identify any mismatch between information included in the beacon reports about access points detectable by corresponding devices with known signatures (known profiles) of access points available to network controller 104. If such mismatch is detected, network controller 104 can flag/identify existence of a potential access point impersonator. For example, network controller 104 may have known signature of access point 204. However, the beacon report received from device 214 at access point 204 and then forwarded to network controller 104 at S300 may include signatures of access points (e.g., that of potential access point impersonator 212) that differ from known signature of access point 204. Accordingly, network controller 104 can flag/identify presence of a potential access point impersonator within coverage area 204-1 of access point 204.

At S308, network controller 104 determines if any given geographical area (target area) is determined (identified/flagged) as have potential access point impersonator(s) operating therein. If not, the process reverts back to S300 and network controller 104 repeats S300 to S308 until at least one potential access point impersonator is identified within a given geographical area. If at S308, network controller 104 determines that a geographical area with at least one potential access point impersonator is identified, then at S310, network controller 104 sends on-demand beacon requests to access point(s) providing coverage and connectivity in the target area(s). For example, upon detecting a potential access point impersonator being present in coverage area 204-1, network controller 104 sends an on-demand beacon request to access point 204, access point 208 and access 210 (because coverage areas 204-1, 208-1 and 210-1 overlap with target area 216 in FIG. 2).

Upon receiving the on-demand beacon request, the receiving access point(s) (e.g., access points 204, 208 and 210) can in turn send an on-demand beacon request (e.g., IEEE 802.11k beacon request) to their/its associated devices (e.g., device 214 associated with access point 204) with one or more instructions. Such one or more instructions can include, but are not limited to, request to scan certain frequencies, to scan with specified dwelling times, to filer on specific frames (e.g., IEEE 802.11 and block acknowledgment (BA)), etc.

In one example, instructions include instructions for checking for specific frames. IEEE 802.11 provides the capability for network controller 104 to store a set of known features/frame types in association with a given access point such as access point 204, 208 and/or 210. Therefore, network controller 104 can check for these known features/frame types by instructing access points 204, 208 and/or 210 to communicate with their connected devices (e.g., device 218) to see if a response from a responder (e.g., device 214), matches the known features/frame types or not. For example, access points 204, 208 and/or 210 may support Admission Control Mandatory (ACM) for voice priority queue. Accordingly, network controller 104 may instruct access points 204, 208 and/or 210 to send an Add Traffic Stream (ADDTS) request for the voice queue to device 214.

The queried device(s) (e.g., device 214) can then send a beacon report back to their serving access point(s) (e.g., access points 204, 208 and 210), which the serving access point(s) can forward back to network controller 104.

At S312, network controller 104 can receive the beacon report(s) from access points 204, 208 and 210, in response to the on-demand beacon request sent at S310.

At S314, network controller 104 cross validates the beacon report(s) received at S312 with beacon reports at S300 to locate an access point impersonator such as access point impersonator 212 within target area 216. This may be performed by checking if any of the beacon reports received at S312 match known characteristics of the corresponding access point (e.g., ACM feature described above). In case of a mismatch, network controller 104 can detect presence of impersonator 112

In one example, this locating may be performed by using information available via an analytics platform coupled to network controller 104 similar to that described above with reference to S306 (e.g., using location information available via CMX platform), Radio Frequency (RF) information of impersonator 212, etc.

In one example, network controller has a heat map that shows where the signal from each AP is heard on the location map. So, when access point 202 is heard at the point where impersonator 212 is located, there is a mismatch between the heat map (where access point 202 should be heard) and where access point is actually heard at. This can be an indication of presence of an impersonator such as impersonator 212 at . . . it could be an RF fluke (reflection of some sort), and this is why we run further tests. When it is clear that there is a mismatch in feature, or when the signal really can't be heard at that level at that location, DNAC raises the alarm about 212

At S316, network controller 104 identifies which access point(s) (affected access point(s)), such as access points 204, 208 and 210, can detect access point impersonator 212 but not a real access point being impersonated by access point impersonator 212 (e.g., access point 202 which is being impersonated by access point impersonator 212 but cannot be heard by, for example, access point 204). For example, access points 204 and 206 may have directional antennas, such that access points 204 and 210 cannot hear access point 202, which may also have directional antennas. So here, there is an RF impossibility in 202 signal being heard (dete4cted) by access point 204 or 206. Access point 208 and 210 may have omni-directional antennas, so it could be that by some reflection signals bounce, access points 208 and 210 may be able to hear access point 202. While the fact that an access point may be heard by another depends partly on whether such access points have omni directional or directional antennas, another influencing factor may be position and relative distance of access points to one another. For example, even if all access points 202, 204, 206, 208 and 210 have omni directional antennas but are positioned hundreds of meters away from one another, their respective signals may not be heard by other ones of access points 202, 204, 206, 208 and 210.

Therefore, at S316, network controller 104 can determine if access point 206, which should not be able to hear access point 202 (since access point 206 has a directional antenna) but still does, then network controller 104 determines presence of impersonator 212.

At S318, network controller 104 notifies the identified access points at S316 (e.g., access point 206), which can trigger them to send on-channel or off-channel Rogue Containment to mitigate such access point impersonator 212.

At S320, network controller 104 may also provide a notification, communicated via a terminal on which an operator of network 200 can access network controller 104, to the operator to take any appropriate remedial action.

It should be noted that while the problem of rogue access points/access point impersonators may be more widespread with directional antenna radios, such as the deployment shown in FIG. 2, the present disclosure is not limited thereto. Similar conditions can also arise with Omnidirectional Antenna Radios, when for example, the impersonator is at or beyond the cell boundary. In such scenarios, devices associated to the access point may not see a cell, but the access point may either be the real access point or the impersonator, which can be identified via the process of FIG. 3.

With the above description of methods and systems for identifying and containing (disabling) rogue access points/access point impersonators, the disclosure now turns to describing example device/system components for implementing the above systems/methods.

Figure 4A:
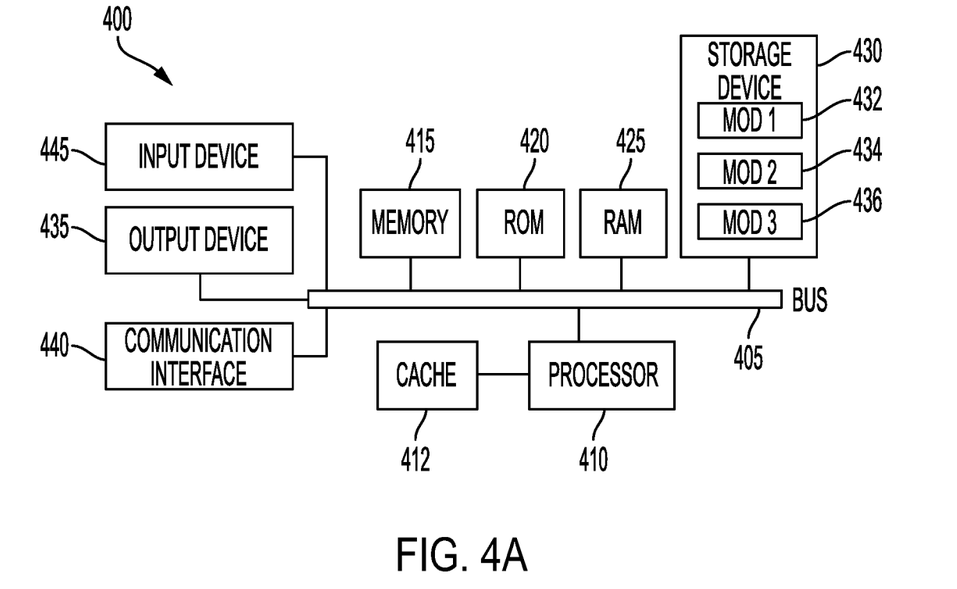
FIGS. 4A and 4B illustrate examples of systems, according to an aspect of the present disclosure.
Figure 4B:
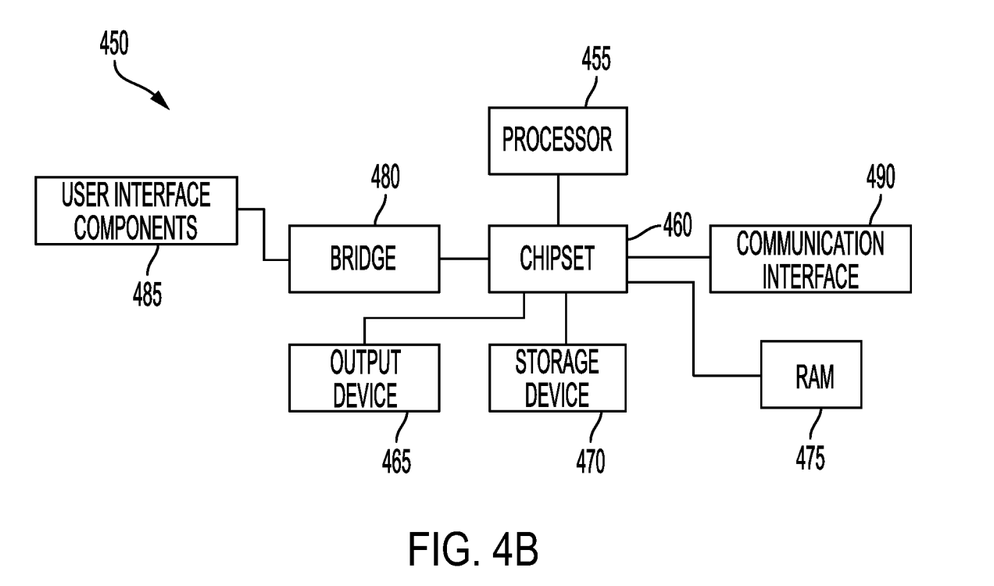

FIGS. 4A and 4B illustrate examples of systems, according to an aspect of the present disclosure. Systems of FIGS. 4A and 4B can be used to implement any one of network controller 104, access points 202, 204, 206, 208 and 210 and/or device 214 or impersonator 212. The more appropriate system will be apparent to those of ordinary skill in the art when practicing the various embodiments. Persons of ordinary skill in the art will also readily appreciate that other systems are possible.

FIG. 4A illustrates an example of a bus computing system 400 wherein the components of the system are in electrical communication with each other using a bus 405. The computing system 400 can include a processing unit (CPU or processor) 410 and a system bus 405 that may couple various system components including the system memory 415, such as read only memory (ROM) 420 and random access memory (RAM) 425, to the processor 410. The computing system 400 can include a cache 412 of high-speed memory connected directly with, in close proximity to, or integrated as part of the processor 410. The computing system 400 can copy data from the memory 415, ROM 420, RAM 425, and/or storage device 430 to the cache 412 for quick access by the processor 410. In this way, the cache 412 can provide a performance boost that avoids processor delays while waiting for data. These and other modules can control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in the storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing system 400, an input device 445 can represent any number of input mechanisms, such as a microphone for speech, a touch-protected screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing system 400. The communications interface 440 can govern and manage the user input and system output. There may be no restriction on operating on any particular hardware arrangement and therefore the basic features here may easily be substituted for improved hardware or firmware arrangements as they are developed.

The storage device 430 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 430 can include the software modules 432, 434, 436 for controlling the processor 410. Other hardware or software modules are contemplated. The storage device 430 can be connected to the system bus 405. In some embodiments, a hardware module that performs a particular function can include a software component stored in a computer-readable medium in connection with the necessary hardware components, such as the processor 410, bus 405, output device 435, and so forth, to carry out the function.

FIG. 4B illustrates an example architecture for a chipset computing system 450 that can be used in accordance with an embodiment. The computing system 450 can include a processor 455, representative of any number of physically and/or logically distinct resources capable of executing software, firmware, and hardware configured to perform identified computations. The processor 455 can communicate with a chipset 450 that can control input to and output from the processor 455. In this example, the chipset 450 can output information to an output device 455, such as a display, and can read and write information to storage device 470, which can include magnetic media, solid state media, and other suitable storage media. The chipset 450 can also read data from and write data to RAM 475. A bridge 480 for interfacing with a variety of user interface components 485 can be provided for interfacing with the chipset 450. The user interface components 485 can include a keyboard, a microphone, touch detection and processing circuitry, a pointing device, such as a mouse, and so on. Inputs to the computing system 450 can come from any of a variety of sources, machine generated and/or human generated.

The chipset 450 can also interface with one or more communication interfaces 490 that can have different physical interfaces. The communication interfaces 490 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 455 analyzing data stored in the storage device 470 or the RAM 475. Further, the computing system 450 can receive inputs from a user via the user interface components 485 and execute appropriate functions, such as browsing functions by interpreting these inputs using the processor 455.

It will be appreciated that computing systems 400 and 450 can have more than one processor 410 and 455, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In another embodiment, instead of using a map-in-map view, the map can be initially zoomed into one primary cluster of interest (e.g. the most important one based on some criteria), while a printed list of the other primary clusters is shown next to the map. This list can be ranked by each cluster's importance, such as by number of sites in each cluster or average health score of each cluster.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
    receiving, at an interval, at a network controller of a network, beacon reports from a plurality of access points, each access point having a respective coverage area and each beacon report including at least information regarding devices connected to the respective access point;
    determining, by the network controller at least in part based on the beacon reports, location information of the plurality of access points and devices connected thereto within the network;
    determining, by the network controller and based on the location information and the beacon reports, that at least one of the devices can detect an access point that is not supposed to be within a range of detection of the at least one of the devices;
    determining, by the network controller based on the location information and beacon reports, one or more target areas with the at least one of the devices operating therein, wherein the one or more target areas include at least one overlap of coverage areas between the plurality of access points;
    sending, by the network controller, on-demand beacon requests to the plurality of access points with the at least one overlap of coverage areas;
    receiving, at the network controller, responses to the on-demand beacon requests from the one or more of the plurality of access points; and
    in response to receiving the responses, determining, by the network controller, at least one access point impersonator based on the responses.

2. The method of claim 1, wherein determining the at least one access point impersonator comprises:
    cross validating, by the network controller, the responses to the on-demand beacon requests with corresponding ones of the beacon reports to yield a validation result; and
    determine the at least one access point impersonator based on the validation result.

3. The method of claim 2, wherein locating the at least one access point impersonator comprises accessing, by the network controller, an analytics platform that includes location information of the plurality of access points and devices operating within the network.

4. The method of claim 1, wherein determining the location information is based on location data available via an analytics platform that includes location information of the plurality of access points and devices operating within the network.

5. The method of claim 1, wherein determining the one or more target areas comprises:
   determining, by the network controller and for a given one of the locations, that there is a mismatch between a corresponding beacon report associated with one of the devices at the given one of the locations and corresponding beacon reports of one or more other devices in proximity to the given one of the locations; and
   determining, by the network controller, the given one of the locations as one of the one or more target areas.

6. The method of claim 1, wherein determining the one or more target areas comprises:
   determining, by the network controller, that there is a mismatch between a profile of at least one of the plurality of access points, based on the beacon reports, and a corresponding known profile of the at least one of the plurality of access points; and
   determining, by the network controller, a corresponding location of the at least one of the plurality of access points, as one of the one or more target areas.

7. A network controller of a network, comprising:
   memory having computer-readable instructions stored therein; and
   one or more processors configured to execute the computer-readable instructions to:
      receive, at an interval, beacon reports from a plurality of access points, each access point having a respective coverage area and each beacon report including at least information regarding devices connected to the respective access point;
      determine, at least in part based on the beacon reports, location information of the plurality of access points and devices connected thereto within the network;
      determine, based on the location information and the beacon reports, that at least one of the devices can detect an access point that is not supposed to be within a range of detection of the at least one of the devices;
      determine, based on the location information and beacon reports, one or more target areas with the at least one of the devices operating therein, wherein the one or more target areas include at least one overlap of coverage areas between the plurality of access points;
      send on-demand beacon requests to the plurality of access points with the at least one overlap of coverage areas;
      receive responses to the on-demand beacon requests from the one or more of the plurality of access points; and
      in response to receiving the responses, determine at least one access point impersonator based on the responses.

8. The network controller of claim 7, wherein the one or more processors are configured to execute the computer-readable instructions to:
   cross validate the responses to the on-demand beacon requests with corresponding ones of the beacon reports to yield a validation result; and
   determine the at least one access point impersonator based on the validation result.

9. The network controller of claim 8, wherein the one or more processors are configured to execute the computer-readable instructions to access an analytics platform that includes location information of the plurality of access points and devices operating within the network to determine a location of the at least one access point impersonator.

10. The network controller of claim 7, wherein determining the location information is based on location data available via an analytics platform that includes location information of the plurality of access points and devices operating within the network.

11. The network controller of claim 7, wherein the one or more processors are configured to execute the computer-readable instructions to:
   determine, for a given one of the locations, that there is a mismatch between a corresponding beacon report associated with one of the devices at the given one of the locations and corresponding beacon reports of one or more other devices in proximity to the given one of the locations; and
   determine the given one of the locations as one of the one or more target areas.

12. The network controller of claim 7, wherein the one or more processors are configured to execute the computer-readable instructions to:
   determine that there is a mismatch between a profile of at least one of the plurality of access points, based on the beacon reports, and a corresponding known profile of the at least one of the plurality of access points; and
   determine a corresponding location of the at least one of the plurality of access points, as one of the one or more target areas.

13. One or more non-transitory computer-readable media comprising computer-readable instructions, which when executed by one or more processors of a network controller of a network, cause the one or more processors to:
   receive, at an interval, beacon reports from a plurality of access points, each access point having a respective coverage area and each beacon report including at least information regarding devices connected to the respective access;
   determine, at least in part based on the beacon, location information of the plurality of access points and devices connected thereto within the network;
   determine, based on the location information and the beacon reports, that at least one of the devices can detect an access point that is not supposed to be within a range of detection of the at least one of the devices;
   determine, based on the location information and beacon reports, one or more target areas with the at least one of the devices operating therein, wherein the one or more target areas include at least one overlap of coverage areas between the plurality of access points;
   send on-demand beacon requests to the plurality of access points with the at least one overlap of coverage areas;
   receive responses to the on-demand beacon requests from the one or more of the plurality of access points; and
   in response to receiving the responses, determine at least one access point impersonator based on the responses.

14. The one or more non-transitory computer-readable media of claim 13, wherein execution of the computer-readable instructions by the one or more processors, cause the one or more processors to:

cross validate the responses to the on-demand beacon requests with corresponding ones of the beacon reports to yield a validation result; and determine the at least one access point impersonator based on the validation result.

15. The one or more non-transitory computer-readable media of claim 14, wherein execution of the computer-readable instructions by the one or more processors, cause the one or more processors to access an analytics platform that includes location information of the plurality of access points and devices operating within the network to determine a location of the at least one access point impersonator.

16. The one or more non-transitory computer-readable media of claim 13, wherein execution of the computer-readable instructions by the one or more processors, cause the one or more processors to:

determine, for a given one of the locations, that there is a mismatch between a corresponding beacon report associated with one of the devices at the given one of the locations and corresponding beacon reports of one or more other devices in proximity to the given one of the locations; and determine the given one of the locations as one of the one or more target areas.

17. The one or more non-transitory computer-readable media of claim 13, wherein execution of the computer-readable instructions by the one or more processors, cause the one or more processors to:

determine that there is a mismatch between a profile of at least one of the plurality of access points, based on the beacon reports, and a corresponding known profile of the at least one of the plurality of access points; and determine a corresponding location of the at least one of the plurality of access points, as one of the one or more target areas.

* * * * *